US008635450B2

(12) United States Patent
Elgebaly et al.

(10) Patent No.: US 8,635,450 B2
(45) Date of Patent: Jan. 21, 2014

(54) IP ENCAPSULATION WITH EXPOSED CLASSIFIERS

(75) Inventors: Hani Elgebaly, Beaverton, OR (US); Farid Adrangi, Lake Oswego, OR (US)

(73) Assignee: Intel Corporation, Santa Clara, CA (US)

(*) Notice: Subject to any disclaimer, the term of this patent is extended or adjusted under 35 U.S.C. 154(b) by 1572 days.

(21) Appl. No.: 11/319,796

(22) Filed: Dec. 28, 2005

(65) Prior Publication Data

US 2007/0147378 A1    Jun. 28, 2007

(51) Int. Cl.
 *H04L 29/06* (2006.01)
(52) U.S. Cl.
 USPC ............. 713/160; 370/392; 370/401; 726/14; 726/15; 726/16
(58) Field of Classification Search
 USPC .......... 713/160; 370/392, 401, 468, 329, 437, 370/466; 380/255; 726/13–15
 See application file for complete search history.

(56) References Cited

U.S. PATENT DOCUMENTS

| | | | |
|---|---|---|---|
| 6,263,443 B1* | 7/2001 | Anderson et al. | 726/1 |
| 6,449,251 B1* | 9/2002 | Awadallah et al. | 370/229 |
| 6,594,268 B1* | 7/2003 | Aukia et al. | 370/400 |
| 8,005,087 B2* | 8/2011 | Dolganow et al. | 370/392 |
| 2001/0005381 A1* | 6/2001 | Sugiyama | 370/466 |
| 2002/0080786 A1* | 6/2002 | Roberts | 370/389 |
| 2003/0212901 A1* | 11/2003 | Mishra et al. | 713/200 |
| 2003/0235209 A1* | 12/2003 | Garg et al. | 370/468 |
| 2004/0083295 A1* | 4/2004 | Amara et al. | 709/229 |
| 2005/0232193 A1* | 10/2005 | Jorgensen | 370/329 |
| 2006/0062238 A1* | 3/2006 | Mahendran et al. | 370/437 |
| 2006/0078120 A1* | 4/2006 | Mahendran et al. | 380/255 |
| 2006/0172722 A1* | 8/2006 | Christensen et al. | 455/410 |

* cited by examiner

*Primary Examiner* — Morshed Mehedi
*Assistant Examiner* — Jason Lee
(74) *Attorney, Agent, or Firm* — Forefront IP Lawgroup, PLLC

(57) ABSTRACT

When a virtual private network (VPN) connection is made, an internet protocol (IP) packet is encrypted and encapsulated within an outer IP packet. Quality-of-service information is placed in the outer packet header that includes classifiers that refer to the encrypted packet.

17 Claims, 7 Drawing Sheets

IP ENCAPSULATION WITH EXPOSED CLASSIFIERS

FIELD

The present invention relates generally to computer networks, and more specifically to internet protocol (IP) packet encapsulation in virtual private networks (VPN).

BACKGROUND

In a typical VPN connection, inner packets are encrypted and encapsulated within outer packets. This makes the inner packets opaque to network layers below that which performs the encryption.

DESCRIPTION OF EMBODIMENTS

Figure 1:
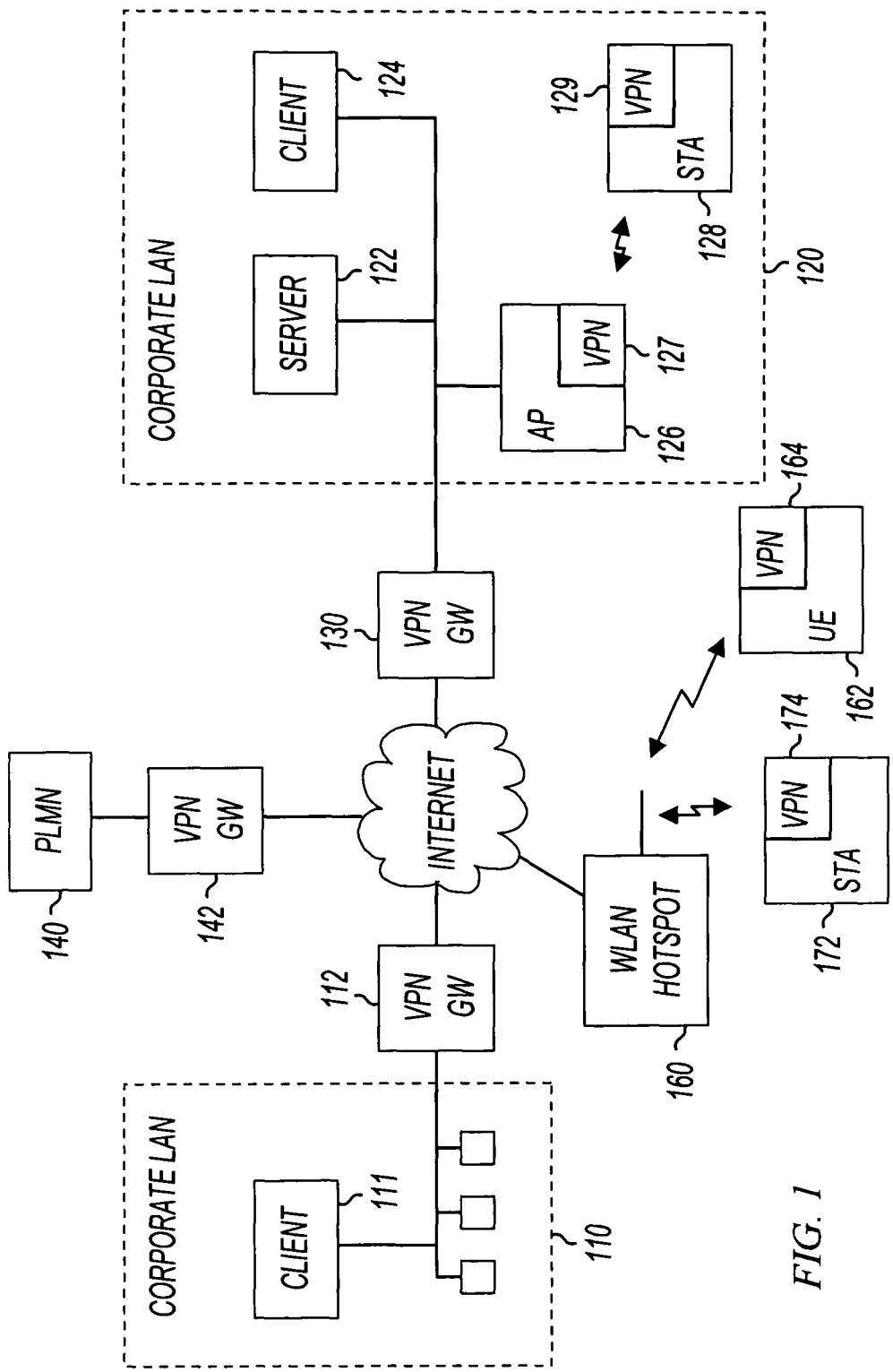
FIG. 1 shows a diagram of a network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of a network. The network includes corporate local area networks (LANs) 110 and 120, public land mobile network (PLMN) 140, VPN gateways 112, 130, and 142, wireless LAN (WLAN) hotspot 160, wireless station (STA) 172, and user equipment (UE) 162, all directly or indirectly coupled to the Internet.

As shown in FIG. 1, the various components of the network may communicate using VPN connections. For example, corporate LANs 110 and 120 may utilize VPN GWs 112 and 130 to create tunneled connections for secure networking across the Internet. Each of VPN GWs 112 and 130 may encrypt IP packets using IP security (IPsec) and encapsulate them in outer packets before forwarding them out to the Internet. Likewise, each of VPN GWs 112 and 130 may decapsulate and decrypt packets received from the Internet before forwarding them in to the respective corporate LAN. The term "corporate LAN" is meant to signify network resources available to any type of corporate body, and is not meant to be limited to any type of business organization. The corporate LANs shown in FIG. 1 may also represent any LAN whatsoever.

Corporate LAN 120 includes server 122, client 124, access point (AP) 126, and wireless station (STA) 128. Server 122 may provide services to other nodes in the corporate LAN. For example, server 122 may provide email, network services, shared documents, or any other type of services. Client 124 may be a device that uses services. For example, client 124 may be a desktop computer that uses services from server 122 or from services provided in corporate LAN 110.

Corporate LAN 120 also includes access point (AP) 126 to provide wireless stations access to the remainder of the LAN. For example, STA 128 may associate with AP 126 to access services provided by server 122. Also for example, STA 128 may associate with AP 126 to access services provided by corporate LAN 110.

AP 126 and STA 128 may be part of an enterprise wireless network. For example, AP 126 may be one of many access points that provide access to the corporate LAN across a corporate campus or in a geographic locale. In some embodiments, AP 126 and STA 128 operate in compliance with a wireless network standard such as IEEE Std. 802.11, 1999 Edition, although this is not a limitation of the present invention. Also for example, AP 126 and STA 128 may operate in compliance with a wireless network standard having quality of service (QoS) extensions, such IEEE Std. 802.11e. As used herein, the term "802.11" refers to any past, present, or future IEEE 802.11 standard, including, but not limited to, the 1999 edition, 802.11e, and others.

IEEE 802.11e includes provisions for call admission control (CAC) and priority processing that can be used to provide quality-of-service (QoS) for various traffic classes or "access categories." Example access categories include voice, video, best effort, and background. Access categories may also include any other type of traffic over a WLAN. IP packets in compliance with IEEE 802.11e may include "classifiers" in packet headers to allow wireless stations, access points, and other devices in the infrastructure to determine traffic priority with or without admission. For example, packet headers may include classifiers such as 802.1p fields, differential services code point (DSCP) tags, source/destination IP addresses, and source/destination port addresses. This type of packet header information is referred to herein as "quality-of-service (QoS) information". The term "QoS information" also refers to any information included in a packet that may be interpreted for purposes of determining traffic priority.

Access point 126 includes VPN device 127, and STA 128 includes VPN device 129. In some embodiments, STA 128 may utilize VPN device 129 to create a tunneled connection to AP 126, thereby providing a secure connection between the user of STA 128 and the corporate LAN 120. In addition to connecting over a virtual private network, STA 128 may utilize quality-of-service features of the wireless network. For example, STA 128 may create IP packets that include classifiers in headers, where the classifiers are useful to prioritize traffic. VPN device 129 within STA 128 encrypts the IP packets and encapsulates them into outer packets. In accordance with standard VPN practice, VPN device 129 builds the outer packet to include source and destination IP addresses that correspond to the endpoints of the VPN rather than the endpoints of the tunneled connection.

In some embodiments, VPN device 129 also inserts QoS information in the header of the outer packet, where the QoS information corresponds to the tunneled connection. For example, VPN device 129 may read classifiers in the original IP packet header prior to encryption, and then may replicate one or more classifiers in the outer packet header. According to various embodiments of the present invention, VPN device 129 may add to the outer packet header any type of information relating to the inner packet to allow lower network layers to determine traffic priority. This is referred to as "IP encapsulation with exposed classifiers." Examples of QoS information that may be added to an outer packet header include source/destination IP addresses, source/destination port addresses, and protocol type.

In some embodiments, when AP 126 receives an IP packet from STA 128, VPN device 127 decapsulates (also referred to as "detunnels") the packet, decrypts the inner IP packet, and forwards the decrypted packet on to the appropriate destination. In other embodiments, VPN device 127 does not have access to any keys to decrypt packets. In these embodiments, VPN device 127 may gather QoS information, strip the outer IP encapsulation, and forward the packet to a VPN GW that can perform the decryption and further forward the packet through the network.

Access point 126 has been described as an access point that provides wireless connections, although this is not a limitation of the present invention. For example, AP 126 may be, or may include, an access router that accepts wired connections in lieu of, or in addition to, wireless connections. Accordingly, anything described herein with respect to wireless access points also applies to wired access routers.

Corporate LAN 110 is shown including client 111. Client 111 may use services from servers within corporate LAN 110, corporate LAN 120, or some other network. For example, client 111 may access email, network services, shared documents, video, audio, or any other type of service from server 122 within corporate LAN 120. In some embodiments, a VPN connection may be created between VPN GW 112 and VPN GW 130 to support a secure wired connection between client 111 and server 122. In addition, in some embodiments, (e.g., for voice over IP connections), the secure connection may be subject to quality-of-service (QoS) constraints. In these embodiments, VPN GWs 112 and 130 may be responsible for QoS enforcement for the secure connection as described above.

WLAN hotspot 160 may include one or more access points (AP) to allow wireless users to associate therewith. For example, STA 172 and UE 162 may associate with an AP in wireless hotspot 160. As shown in FIG. 1, STA 172 includes VPN device 174, and UE 162 includes VPN device 164. In some embodiments, STA 172 may connect to a corporate LAN such as LAN 110 or LAN 120 using a VPN. For example, a user of STA 172 may be a user with access privileges to server 122, but the network policy may require use of a VPN when logging in from a hotspot such as WLAN hotspot 160. In these embodiments, VPN device 174 may operate in accordance with the principles described above with respect to VPN device 129 in STA 128. For example, VPN device 174 may add QoS information to an outer packet header, where the QoS information refers to the traffic in the tunneled connection. STA 172 may be any type of device capable of communicating with an access point in a wireless network. For example, STA 172 may be a laptop computer, a network interface card, a wireless bridge or router, a handheld wireless device, a personal digital assistant, or the like. VPN device 174 may be implemented in hardware, software, or any combination.

Public land mobile network (PLMN) 140 represents any wireless communications system intended for use by subscribers. For example, PLMN 140 may be a cellular telephone network or wireless data network such as a 3GPP network.

The 3G partnership project (3GPP) defines reference architectures for the universal mobile telecommunication system (UMTS) core network that provides the users of user equipment (UE) with access to services. The term "service" used in this context includes any services or goods which a user may desire, require, or be provided with. For example, services provided by PLMN 140 may include internet protocol multimedia instant messaging (IM) services, conferencing, telephoning, gaming, and the like.

Users of PLMN 140 may connect directly with PLMN 140 (without going through the Internet) as in the case of a cellular phone connecting through a cell site. In some embodiments of the present invention, some users of PLMN 140 may connect through the Internet. For example, a user of UE 162 may connect to PLMN 140 through the Internet. Further, in some embodiments, UE 162 may connect to PLMN 140 using a VPN. As shown in FIG. 1, UE 162 includes VPN device 164. VPN device 164 may operate in accordance with the principles described above with reference to other VPN devices. For example, VPN device 164 may add QoS information to a header of an outer packet, where the QoS information refers to the traffic in the tunneled connection.

UE 162 may be any type of apparatus capable of communicating with PLMN 140 over a VPN on a wireless network. For example, UE 162 may be a phone capable of connecting to either a cell site or an access point. Also for example, UE 162 may be a computer such as a laptop capable of utilizing services provided by PLMN 140. In some embodiments, UE 162 and STA 172 are combined. For example, a single piece of equipment in the hands of a user may be able to connect to any of the networks represented by FIG. 1 using VPN technology.

The various embodiments of the present invention provide for coexistence of QoS-enabled networks and VPN connections by adding QoS information to an outer packet header. The QoS-enabled networks may be wireless networks, wired networks, or any combination. The existence of the QoS information in the outer header allows network layers below a client's IPsec layer to perform packet inspection based on the QoS information to determine whether the traffic should be allowed or blocked based on the local policy. Further, a lower level media access control (MAC) layer may inspect source/destination IP addresses, source/destination port addresses, protocol type, or any other QoS information provided in the outer packet header to determine how to handle the tunneled traffic. The various embodiments of the present invention may be applied in any network scenario having connections with QoS constraints. For example, QoS constraints may exist in wireless connections, wired connections, or any combination.

In some embodiments, packet filters may be installed in various network nodes to inspect the QoS information in outer packets. The packet filters may intercept outbound or inbound encrypted traffic and determine whether the packet should be forwarded to the next network layer, or if some other action should be taken. For example, a packet filter may be configured to drop some encrypted traffic, and to forward on other encrypted traffic. Also for example, a packet filter may be configured to strip the QoS information out from the outer packet. This may be useful if the outer packet has already traversed the QoS-enabled portion of the network, and there is no need to continue to expose classifiers in the outer packet. In general, packet filters may perform any operation with intercepted packets based on QoS information in the packet and the filter's configured policy.

Many of the features of the present invention may be enabled through VPN configuration at the VPN endpoints.

For example, VPN devices in wireless stations, access points, and gateways may be manually configured to expose classifiers in outer packet headers. Also for example, packet filters may be manually configured based on local policy. Alternatively, many of the features may be negotiated through Internet key exchange (IKE) for a VPN connection.

Figure 2:
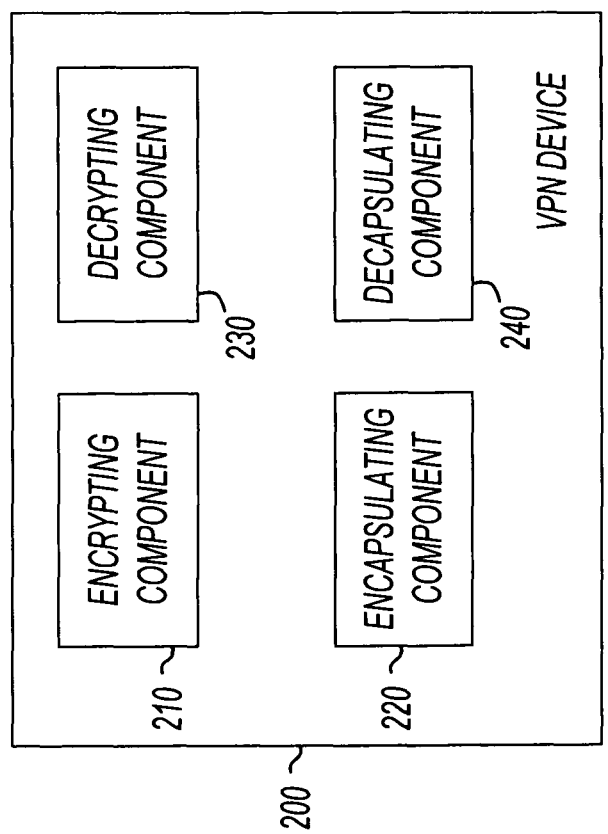
FIG. 2 shows a diagram of a VPN device.

FIG. 2 shows a diagram of a VPN device. VPN device 200 includes encrypting component 210, encapsulating component 220, decrypting component 230, and decapsulating component 240. The various components shown in FIG. 2 may be implemented in hardware, software, or any combination. For example, software running on a processor or controller may implement encrypting component 210 by making calls to an IPsec library of routines, while encapsulating component 220 may be implemented in a combination of hardware and software. The various embodiments of the invention are not limited by the type of technology used to implement the various components within VPN device 200.

VPN device 200 may be a VPN device in a gateway (GW), a wireless station (STA), an access point (AP), user equipment (UE), or any other suitable apparatus. When VPN device 200 receives a packet from within the VPN domain, encrypting component 210 encrypts the packet, and encapsulating component 220 encapsulates the encrypted packet in an outer packet to create a tunneled connection. Encapsulating component 220 also adds QoS information, if available, to the header of the outer packet. When VPN device 200 receives a packet from outside the VPN domain, decapsulating component 240 decapsulates the packet, and decrypting component 230 decrypts the inner packet.

Figure 3:
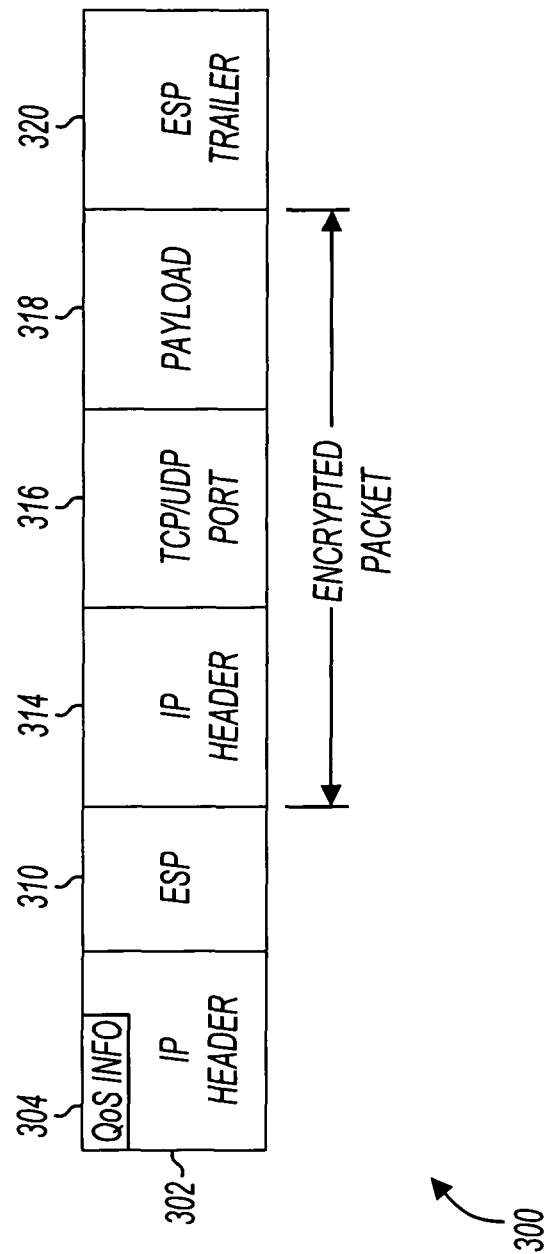
FIG. 3 shows a diagram of an IPsec tunnel mode packet.

FIG. 3 shows a diagram of an IPsec tunnel mode packet. IPsec tunnel mode packet 300 is an "outer" packet that encapsulates an inner packet. The inner packet includes IP header 314, TCP/UDP port information 316, and payload 318. The inner packet is encrypted and encapsulated in packet 300 between encapsulating security payload (ESP) header 310 and ESP trailer 320.

IP header 302 includes QoS information 304 that refers to the tunneled connection supported by the encrypted packet. This QoS information provides a mechanism to expose classifiers that would otherwise be hidden from network layers with access to only the encrypted version of the inner packet. QoS information 304 may include any type of information available in the inner packet. For example, in 802.11e applications, QoS information 304 may include fields from a frame classifier field of an 802.11e compliant IP header. QoS information 304 may be defined as an "IP option" in the IP header. FIG. 3 shows an example IP option that supports exposed classifiers.

Figure 4:
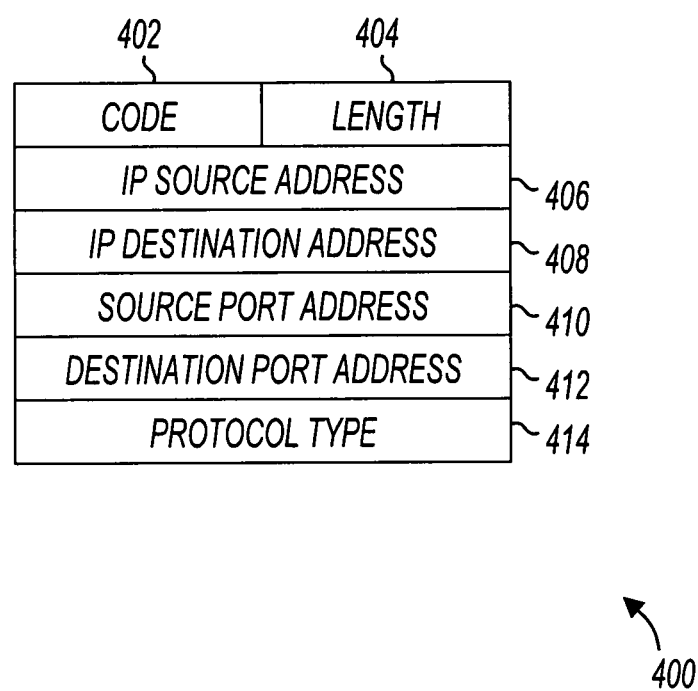
FIG. 4 shows an IP option.

FIG. 4 shows an IP option. IP option 400 is an example IP option to hold QoS information 304 (FIG. 3). IP option 400 is referred to herein as a "classifier option," in part because it may hold classifier information from an encapsulated packet. IP option 400 includes the option code 402, length field 404, IP source address 406, IP destination address 408, source port address 410, destination port address 412, and protocol type 414. It is to be understood that the fields shown in IP option 400 are illustrative, and the various embodiments of the invention are not so limited. Any number of different fields may be included in IP option 400 without departing from the scope of the present invention. When included in an outer packet header, IP option 400 exposes classifiers that allow lower network layers to prioritize encapsulated encrypted traffic.

Figure 5:
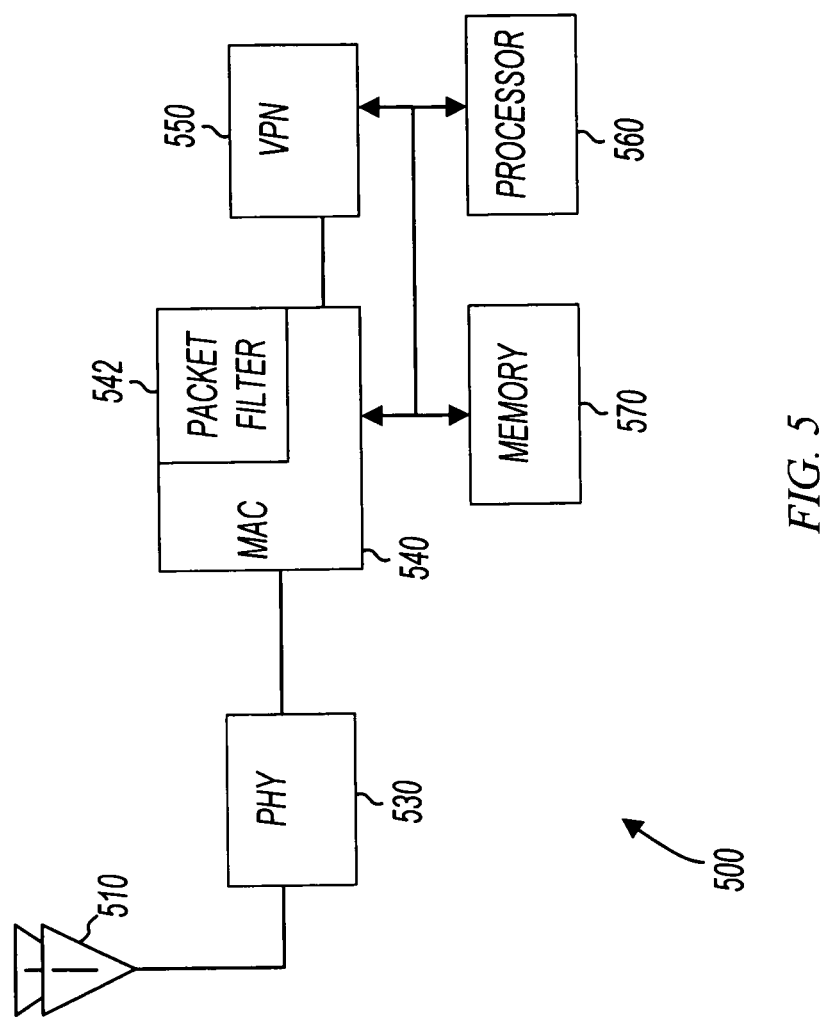
FIG. 5 shows a system diagram in accordance with various embodiments of the present invention.

FIG. 5 shows a system diagram in accordance with various embodiments of the present invention. Electronic system 500 includes antennas 510, physical layer mechanism (PHY) 530, media access control (MAC) mechanism 540 with packet filter 542, VPN device 550, processor 560, and memory 570. In some embodiments, electronic system 500 may be a wireless station, a wireless interface, a network interface controller (NIC), or the like. For example, electronic system 500 may be utilized in the network of FIG. 1 as any of wireless stations 128 or 172, access point 126, hotspot 160, or user equipment 162. Also for example, electronic system 500 may be an apparatus capable of performing any of the method embodiments described herein.

In some embodiments, electronic system 500 may represent a system that includes a wireless interface as well as other circuits. For example, in some embodiments, electronic system 500 may be a computer, such as a personal computer, a workstation, or the like, that includes a wireless interface as a peripheral or as an integrated unit.

In operation, system 500 sends and receives signals using antennas 510, and the signals are processed by the various elements shown in FIG. 5. Antennas 510 may include one or more directional antennas or one or more omni-directional antennas. As used herein, the term omni-directional antenna refers to any antenna having a substantially uniform pattern in at least one plane. For example, in some embodiments, antennas 510 may include an omni-directional antenna such as a dipole antenna, or a quarter wave antenna. Also for example, in some embodiments, antennas 510 may include a directional antenna such as a parabolic dish antenna or a Yagi antenna. In some embodiments, antennas 510 form an array capable of supporting spatial division multiple access (SDMA) or multiple-input multiple output (MIMO) communications. In other embodiments, antennas 510 include only one physical antenna.

Physical layer mechanism (PHY) 530 may be any suitable physical layer implementation. For example, PHY 530 may be a circuit block that implements a physical layer that complies with an IEEE 802.11 standard or other standard. Examples include, but are not limited to, direct sequence spread spectrum (DSSS), frequency hopping spread spectrum (FHSS), and orthogonal frequency division multiplexing (OFDM). PHY 530 is coupled to antennas 510 to interact with a wireless network. PHY 530 may include circuitry to support the transmission and reception of radio frequency (RF) signals. For example, in some embodiments, PHY 530 includes an RF receiver to receive signals and perform "front end" processing such as low noise amplification (LNA), filtering, frequency conversion or the like. Further, in some embodiments, PHY 530 includes beamforming circuitry to support SDMA processing. Also for example, in some embodiments, PHY 530 includes circuits to support frequency up-conversion, and an RF transmitter. The various embodiments of the invention are not limited by the contents or function of PHY 530.

Media access control (MAC) mechanism 540 may be any suitable media access control layer implementation. For example, MAC 540 may be implemented in software, or hardware or any combination thereof. In some embodiments, a portion of MAC 540 may be implemented in hardware, and a portion may be implemented in software that is executed by processor 560. Further, MAC 540 may include a processor separate from processor 560.

MAC 540 includes packet filter 542. In some embodiments, packet filter 542 interprets QoS information in IP packet headers and takes action in response thereto. For example, packet filter 542 may allow or block encrypted traffic as a function of IP and port addresses of the encrypted traffic, and also based on local policy. The IP and port addresses of encrypted traffic may be included in an outer packet header as described above with respect to the previous figures.

VPN device 550 may include any suitable VPN implementation. In some embodiments, VPN device 550 implements IPsec tunnelling to form secure connections. In addition, VPN device 550 may add QoS information to outer packet headers when encapsulating encrypted traffic. VPN device 550 is shown separate from memory 570 and processor 560, although this is not a limitation of the present invention. For example, all or a portion of VPN device 550 may be implemented in software components that are stored in memory 570 and executed by processor 560.

Figure 6:
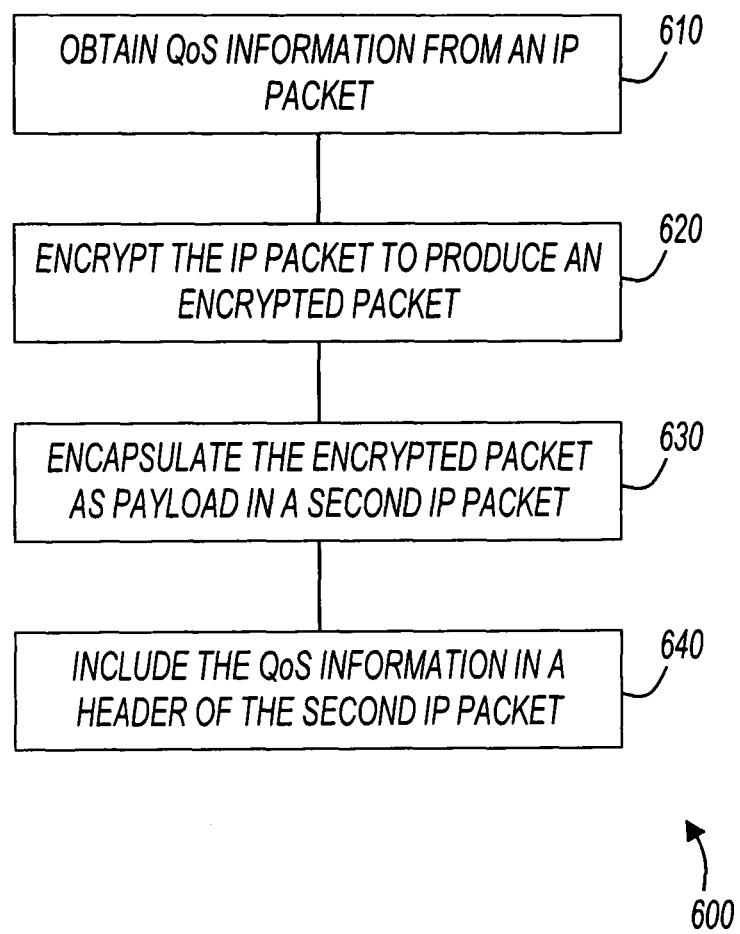
FIGS. 6 and 7 show flowcharts in accordance with various embodiments of the present invention.
Figure 7:
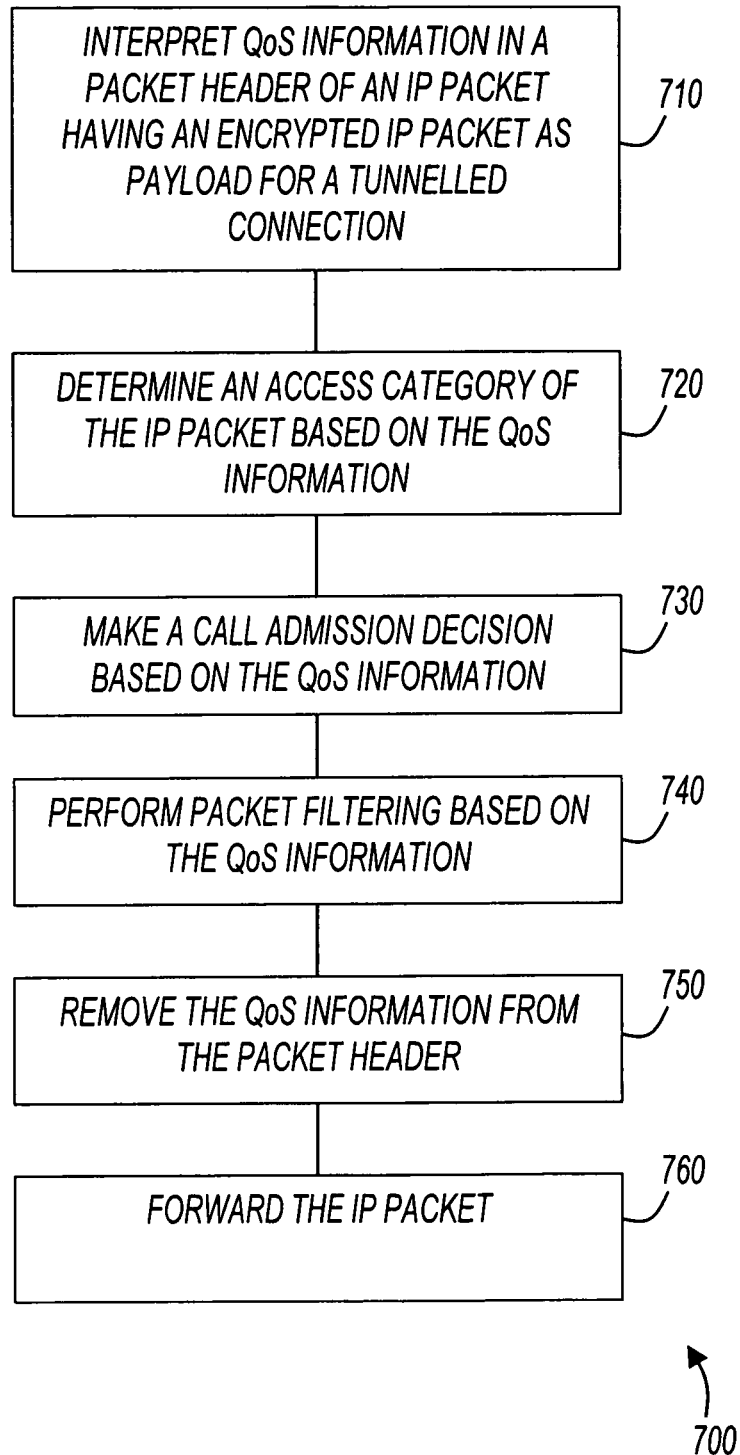

Processor 560 may perform method embodiments of the present invention, such as methods 600 and 700 (FIGS. 6, 7). Processor 560 may also implement portions of VPN device 550, MAC 540, or packet filter 542. Processor 560 represents any type of processor, including but not limited to, a microprocessor, a digital signal processor, a microcontroller, or the like.

Memory 570 represents an article that includes a machine readable medium. For example, memory 570 represents a random access memory (RAM), dynamic random access memory (DRAM), static random access memory (SRAM), read only memory (ROM), flash memory, or any other type of article that includes a medium readable by processor 560. Memory 570 may store instructions for performing the execution of the various method embodiments of the present invention.

FIG. 6 shows a flowchart in accordance with various embodiments of the present invention. In some embodiments, method 600, or portions thereof, is performed by a VPN device, embodiments of which are shown in the various figures. In other embodiments, method 600 is performed by a wireless station, a network interface card (NIC), a processor, an integrated circuit or an electronic system. Method 600 is not limited by the particular type of apparatus or software performing the method. The various actions in method 600 may be performed in the order presented, or may be performed in a different order. Further, in some embodiments, some actions listed in FIG. 6 are omitted from method 600.

Method 600 is shown beginning with block 610 in which quality-of-service (QoS) information is obtained from an IP packet. This may correspond to a VPN device interpreting the header of an IP packet that is compliant with a wireless network standard with QoS extensions such as IEEE 802.11e. The QoS information may include traffic classifiers as described above. At 620, the IP packet is encrypted to produce an encrypted packet, and at 630, the encrypted packet is encapsulated in a second IP packet.

At 640, the QoS information is included in a header of the second IP packet. In some embodiments, the QoS information may take the form of an IP option such as IP option 400 (FIG. 4). The actions of method 600 create a tunnel mode packet with QoS information in the header, where the QoS information refers to the encrypted packet. The QoS exposes information from the inner packet that would otherwise be hidden from view by virtue of the encryption.

FIG. 7 shows a flowchart in accordance with various embodiments of the present invention. In some embodiments, method 700, or portions thereof, is performed by a VPN device, embodiments of which are shown in the various figures. In other embodiments, method 700 is performed by a wireless station, a network interface card (NIC), a packet filter, a processor, an integrated circuit or an electronic system. Method 700 is not limited by the particular type of apparatus or software performing the method. The various actions in method 700 may be performed in the order presented, or may be performed in a different order. Further, in some embodiments, some actions listed in FIG. 7 are omitted from method 700.

Method 700 is shown beginning with block 710 in which QoS information in a packet header is interpreted. The packet header is part of an IP packet having an encrypted IP packet as payload for a tunneled connection. In some embodiments, the actions of 710 correspond to an apparatus interpreting QoS information 304 (FIG. 3) in IPsec tunnel mode packet 300.

At 720, an access category of the IP packet is determined based on the QoS information. For example, the IP packet may be placed in a different queue for transmission based on whether the IP packet is categorized as voice, video, data traffic, or some other type of traffic. A priority may also be assigned based on the QoS information.

At 730, a call admission decision is made based on the QoS information. Any algorithm may be employed to make call admission decisions. At 740, packet filtering is performed based on the QoS information, and at 750, the QoS information is removed from the packet header. At 760, the packet is forwarded. The packet may be forwarded to higher or lower network levels based on the traffic direction.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method performed by a virtual private network (VPN) gateway, the method comprising:
    obtaining quality-of-service (QoS) information from an internet protocol (IP) packet having a classifier in a header;
    encrypting the IP packet to produce an encrypted packet;
    encapsulating the encrypted packet as payload in a second IP packet;
    including the QoS information in a header of the second IP packet;
    filtering the second IP packet based on the QoS information;
    stripping the QoS information from the header of the second IP packet, leaving the classifier in the header of the second IP packet; and
    forwarding the second IP packet without the QoS information in the header.

2. The method of claim 1 wherein the QoS information includes an IP source address.

3. The method of claim 1 wherein the QoS information includes a source port address.

4. The method of claim 1 wherein the QoS information includes an IP destination address.

5. The method of claim 1 wherein the QoS information includes a destination port address.

6. The method of claim 1 wherein the QoS information includes a protocol type.

7. The method of claim 1 further comprising transmitting the second IP packet over a wireless network.

8. The method of claim 1 further comprising transmitting the second IP packet over a wired network.

9. A method performed by a virtual private network (VPN) gateway, the method comprising:
    interpreting quality-of-service (QoS) information in an unencrypted packet header of an internet protocol (IP) packet having a classifier in a header;
    encrypting the IP packet to produce an encrypted IP packet;
    encapsulating the encrypted IP packet as payload in a second IP packet;
    including the QoS information in a header of the second IP packet;
    filtering the second IP packet based on the QoS information;
    stripping the QoS information from the header of the second IP packet, leaving the classifier in the header of the second IP packet; and
    forwarding the second IP packet without the QoS information in the unencrypted packet header.

10. The method of claim 9 further comprising determining an access category of the IP packet based on the QoS information in the unencrypted packet header.

11. The method of claim 9 further comprising making a call admission decision based on the QoS information.

12. The method of claim 9 further comprising performing packet filtering based on the QoS information.

13. The method of claim 9 wherein interpreting QoS information comprises reading IP source and destination addresses of the encrypted IP packet.

14. The method of claim 9 wherein interpreting QoS information comprises reading a protocol type of the encrypted IP packet.

15. An electronic system comprising:
an antenna;
a radio frequency circuit coupled to the antenna;
a media access control layer coupled to the radio frequency circuit; and
a virtual private network device to provide nonencrypted packets to the media access control layer, the virtual private network device comprising an encrypting component to encrypt an Internet Protocol (IP) packet having quality-of-service (QoS) information and a classifier in a header, an encapsulating component to encapsulate the encrypted packet in one or more nonencrypted packets having headers that include the QoS information, and a packet filter to filter the nonencrypted packet based on the QoS information, to remove the QoS information from the nonencrypted packet while leaving the classifier in the nonencrypted packet, and to forward the nonencrypted packets without the QoS information.

16. The electronic system of claim 15 wherein the QoS information includes an internet protocol (IP) source address corresponding to a source of the encrypted packets.

17. The electronic system of claim 15 wherein the QoS information includes an internet protocol (IP) destination address corresponding to a destination of the encrypted packets.

* * * * *